US012743515B2

(12) United States Patent
Jackson

(10) Patent No.: US 12,743,515 B2
(45) Date of Patent: Sep. 22, 2026

(54) SYSTEM AND METHOD FOR DETECTING AND PREVENTING PROMPT INJECTION ATTACKS

(71) Applicant: Charter Communications Operating, LLC, St. Louis, MO (US)

(72) Inventor: Julian Jackson, Gray Court, SC (US)

(73) Assignee: Charter Communications Operating, LLC, St. Louis, MO (US)

(*) Notice: Subject to any disclaimer, the term of this patent is extended or adjusted under 35 U.S.C. 154(b) by 422 days.

(21) Appl. No.: 18/372,808

(22) Filed: Sep. 26, 2023

(65) Prior Publication Data

US 2025/0103715 A1 Mar. 27, 2025

(51) Int. Cl.
*G06F 21/56* (2013.01)

(52) U.S. Cl.
CPC ...... *G06F 21/566* (2013.01); *G06F 2221/031* (2013.01)

(58) Field of Classification Search
CPC ................ G06F 21/566; G06F 21/577; G06F 2221/031; G06F 2221/033; G06N 3/092
See application file for complete search history.

(56) References Cited

U.S. PATENT DOCUMENTS

| | | | |
|---|---|---|---|
| 8,112,444 B2 | 2/2012 | Schwartz et al. | |
| 11,431,738 B2 | 8/2022 | Jeyakumar et al. | |
| 11,562,267 B2 | 1/2023 | Polleri et al. | |
| 12,423,443 B2 * | 9/2025 | Lafon | G06F 16/3329 |
| 2021/0117544 A1 | 4/2021 | Kurtz et al. | |
| 2023/0359903 A1 * | 11/2023 | Cefalu | G06F 40/279 |
| 2024/0386103 A1 * | 11/2024 | Clement | G06F 21/56 |

FOREIGN PATENT DOCUMENTS

WO 2020/132137 A1 6/2020

* cited by examiner

*Primary Examiner* — Paul E Callahan
(74) *Attorney, Agent, or Firm* — The Marbury Law Group, PLLC

(57) ABSTRACT

The systems, methods, devices, and non-transitory media of the various embodiments may provide for preventing prompt injections in a communication system. Various embodiments may enable receiving a prompt from a client computing device, evaluating content of the prompt using one or more pre-filter module, determining whether the content of the prompt is safe based on the pre-filter module evaluation. In response to determining that the content of the prompt is safe, various embodiments may enable inputting the prompt to a main machine-learning model for processing such a machine-learning output is created, evaluating content of the machine-learning output using one or more post-filter module, and determining whether the content of the machine-learning output is safe based on the post-filter module evaluation.

30 Claims, 5 Drawing Sheets

SYSTEM AND METHOD FOR DETECTING AND PREVENTING PROMPT INJECTION ATTACKS

BACKGROUND

Software applications that aim to mimic human conversation through text or voice interactions have gained widespread attention due to their capabilities and the various fields for application. Such applications, often called bots or chatbots, are artificial intelligence (AI) systems that are capable of maintaining a conversation with a user in natural language and simulating the way a human would behave as a conversational partner. Such products, such as OpenAI's Chat Generative Pretrained Transformer (ChatGPT®), followed by alternatives such as Microsoft's Bing Chat® (which uses OpenAI's GPT-4®) and Google's Bard®, are typically built based upon broad foundational large language models (LLMs) that get fine-tuned so as to target specific tasks or applications (i.e., simulating human conversation).

LLMs are deep learning models that can recognize, summarize, translate, predict, and generate content using large datasets. Specifically, LLMs use deep learning algorithms and large amounts of data to learn the nuances of language and produce coherent and relevant responses. The ability to learn language patterns allows an application to generate responses that are not pre-scripted, and to reply to prompts with personalized and contextually relevant responses to use in real-time, making it particularly useful in customer service.

A user typically interacts with an LLM-based application to accomplish a task by inputting a prompt. Prompts may include instructions, questions, or any other type of input, depending on the intended use of the model. Prompts can also include specific constraints or requirements, such as tone, style, or desired length of the response. For example, a prompt to write a letter to a particular person can specify tone, word limit, and specific topics to include.

The quality and relevance of the response generated by the LLM is heavily dependent on the quality of the input. Therefore, LLM-reliant applications may be subject to security vulnerabilities that cause the models to generate unwanted content and/or perform undesired actions, such as prompt injection attacks.

SUMMARY

The systems, methods, devices, and non-transitory media of the various embodiments may provide for preventing prompt injections in a communication system. Various embodiments may include receiving a prompt from a client computing device, evaluating content of the prompt using one or more pre-filter module, and determining whether the content of the prompt is safe based on the pre-filter module evaluation. In various embodiments, the prompt may be configured to invoke a machine-learning application.

Various embodiments may include, in response to determining that the content of the prompt is safe, inputting the prompt to a main machine-learning model for processing such that a machine-learning output is created, evaluating content of the machine-learning output using one or more post-filter module, and determining whether the content of the machine-learning output is safe based on the post-filter module evaluation.

Various embodiments may further include, in response to determining that the content of the machine-learning output is safe, generating a response message based on the machine-learning output, returning the response message to the client computing device.

Various embodiments may further include preventing execution of the prompt by the machine-learning model in response to determining that the content of the prompt is not safe. Various embodiments may further include sending the prompt to a malicious prompt corpus in response to determining that the content of the prompt is not safe. In various embodiments, the malicious prompt corpus may be a database accessible to one or more computing device, and the at least one pre-filtering module and the at least one post-filtering module may be configured to use the malicious prompt corpus to improve evaluations.

Various embodiments may further include flagging the prompt for future review in response to determining that the content of the prompt is not safe. Various embodiments may further include preventing generation of a response message in response to determining that the content of the machine-learning output is not safe.

Various embodiments may further include, in response to determining that the content of the machine-learning output is not safe, generating an error message, and returning the error message to the client computing device. Various embodiments may further include flagging the prompt for future review in response to determining that the content of the machine-learning output is not safe.

Various embodiments may further include sending the prompt to a malicious prompt corpus in response to determining that the content of the machine-learning output is not safe. In various embodiments, determining whether the content of the prompt is safe may be further based on context information received by one or more network computing device.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
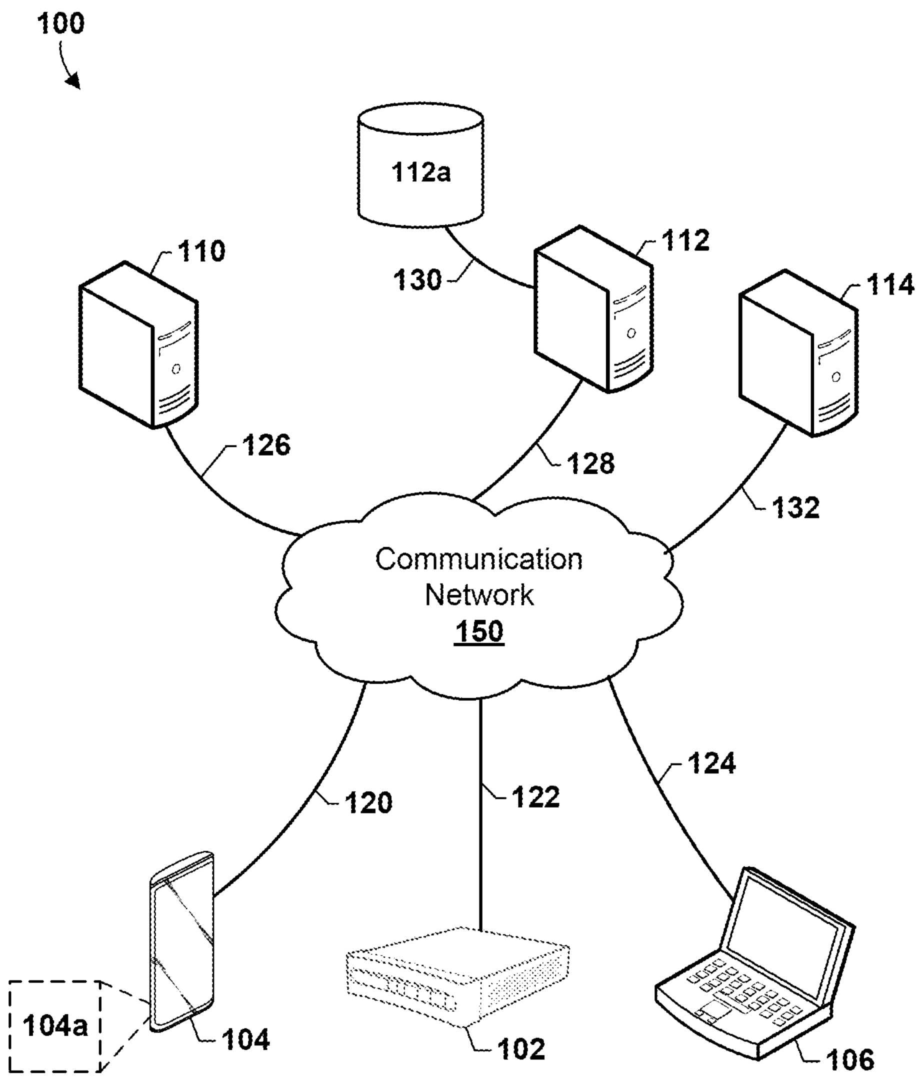
FIG. 1 is a system block diagram of a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

The term "computing device" is used herein to refer to any one or all of network elements such as servers, routers, set top boxes, head-end devices, and other similar network elements, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cordless phones, network-connected displays (such as advertisement screens, news screens, and the like), wireless local loop (WLL) station, entertainment devices (for example, a music or video device, or a satellite radio), gaming devices, wireless gaming controllers, cameras, medical devices or equipment, biometric sensors/devices, wearable devices (such as smart watches, smart clothing, smart glasses, smart wrist bands, smart jewelry (for example, smart ring, smart bracelet)), smart meters/sensors, industrial manufacturing equipment, router devices, appliances, global positioning system devices, wireless-network enabled Internet of Things (IoT) devices including large and small machinery and appliances for home or enterprise use, wireless communication elements within autonomous and semiautonomous vehicles, a vehicular component or sensor, wireless devices affixed to or incorporated into various mobile platforms, and similar electronic devices that include a memory, wireless communication components and a programmable processor, or that is configured to communicate via a wireless or wired medium.

Natural language processing (NLP) algorithms have a variety of uses, as they allow developers and businesses to create software that understands human language. NLP algorithms are typically based on machine learning to automatically learn rules by analyzing a set of examples (i.e., a large corpus, like a book, down to a collection of sentences), and making a statistical inference.

While traditional NLP algorithms typically consider the immediate context of words, LLMs are designed to consider large amounts of text in order to better understand the context and to enable many different NLP tasks, such as text generation, sentiment analysis, question answering systems, automatic summarization, machine translation, document classification, and more. Examples of LLM-based systems and applications include, but are not limited to, Turing NLG® by Microsoft®, Gopher® and Chichilla® by Deepmind®, Switch transformer, GLAM®, PALM®, Lamba®, T5®, and MT5® by Google®, OPT and Fairseq Dense® by Meta®, GPT-3 by OpenAI®, and Ernie 3.0® by Baidu®.

To date, different types of LLMs have been developed for a wide array of applications and functions, with autoregressive models and autoencoding models being two main examples. Autoregressive models, including OpenAI's GPT®, generate text by predicting the next word in a sequence given the previous words. Such autoregressive LLMs are trained to maximize the likelihood of each word in the training dataset, given its context. Autoencoding models, including Google's Bidirectional Encoder Representations from Transformers (BERT)®, learn to generate a fixed-size vector representation of input text by reconstructing the original input from a masked or corrupted version of it. Such autoencoding LLMs are trained to predict missing or masked words in the input text by leveraging the surrounding context. Machine learning systems may implement a combination of autoregressive and autoencoding models.

Several components and processes are implemented by LLMs to enable efficient processing and understanding natural language data. For example, tokenization (i.e., converting a sequence of text into individual words, subwords, or tokens that the model can understand) may be performed using subword algorithms (e.g., Byte Pair Encoding (BPE), WordPiece®, etc.). Such algorithms split the text into smaller units that capture both frequent and rare words.

Embeddings are continuous vector representations of words or tokens that capture their semantic meanings in a high-dimensional space. In an LLM, embeddings are typically learned during the training process, and allow the model to convert discrete tokens into a format that can be processed by the neural network. The resulting vector representations can capture complex relationships between words, such as synonyms or analogies.

The LLM may go through a transformer neural network process that uses attention mechanisms to weigh the importance of different words or phrases in a given context. By assigning a different score (i.e., weight) to a given item (i.e., token) in the input sequence, the model can focus on the most relevant information while ignoring less important details.

Typical LLMs are trained on a large corpus of data, in multiple steps. For example, an LLM may be pretrained on unstructured data and unlabeled data, to derive relationships between different words and concepts. During pretraining, the model learns general language patterns, relationships between words, and other foundational knowledge.

Transfer learning may then be used, which fine-tunes the pretrained model on a smaller, task-specific dataset to achieve high performance on that task. Specifically, this process may assist the LLM to more accurately identify different concepts and perform new tasks.

Training with self-supervised learning may be performed, in which some data labeling has occurred, assisting the model to more accurately identify different concepts and perform new tasks.

Due to the increasing use of LLMs in various applications (e.g., content creation, data analysis, customer support, etc.), new security vulnerabilities impacting LLMs have emerged. Specifically, LLMs utilizing prompt-based learning (e.g., prompt-seeded generation) are vulnerable to prompt injection attacks.

Prompt injection is the process of hijacking an LLM-based system's output using untrusted text as part of the prompt, aiming to elicit an unintended response. Prompt injection attacks come in different forms. For example, one type of attack involves manipulating or injecting malicious content into prompts to exploit the system's vulnerabilities, influence the system's behavior, or deceive users. The consequences of prompt injection attacks vary depending on the system targeted, but may provide attackers with unauthorized access to information and/or allow bypassing security measures.

The specific techniques and consequences of prompt injection attacks vary depending on the system. For example, in the context of language models, prompt injection attacks often aim to steal data. For example, prompt injection techniques have been used to instruct an LLM-based chatbot to "ignore previous instructions" and to reveal what is at the "beginning of the document above," thereby causing the model to divulge its initial instructions that are typically hidden from users.

An example of an indirect prompt injection attack may be in web applications, in which an attacker injects malicious text prompts into web pages. In instances in which users direct the model to interact with the compromised pages, the LLM will follow the malicious prompt text instructions, allowing the attacker to steal sensitive information, perform actions on behalf of the user, or spread malware.

The various embodiments disclosed herein seek to prevent prompt injection attacks in LLM systems, such as chatbots or virtual assistants. The various embodiments disclosed herein provide systems and methods for preventing prompt injection attacks in LLM systems (e.g., chatbots/virtual assistant applications) by applying a pre-filtering evaluation to incoming prompts, and a post-filter evaluation to responses generated by the model. Specifically, upon receiving an incoming prompt from an external source, the prompt may be evaluated by a pre-filter module to determine whether it is likely to be malicious/unsafe. Such evaluation may use techniques such as direct string matching of known malicious content, natural language processing, machine learning, or other anomaly detection to identify characteristics common to known malicious prompts, including subjecting the prompt to the main LLM. In some embodiments, in instances in which the prompt is determined to be unsafe or potentially unsafe, the system may reject the prompt and prevent the LLM from executing instructions contained therein. Optionally, the system may flag unsafe LLM output for human review. In some embodiments, if the prompt is evaluated as safe by the pre-filter, the prompt may be processed by the LLM to generate an output.

In various embodiments, a post-filter module may evaluate the LLM output to determine whether the output contains any content that is malicious/unsafe. Such evaluation may use any content analysis techniques, such as direct string matching of known malicious content, natural language processing, machine learning, or other anomaly detection to identify characteristics common to known malicious prompts, including subjecting the output to the main LLM. In some embodiments, the post-filter evaluation may be the same as that used by the pre-filter, while in other embodiments, the post-filter and pre-filter evaluations may be different.

In some embodiments, in instances in which the output is determined to be unsafe or potentially unsafe, the system may block it from being used in a response to the user, or may modify the output before a response is returned. Optionally, the system may also flag unsafe LLM output for human review.

In various embodiments disclosed herein, prompts identified as unsafe or potentially unsafe by the pre-filter module, as well as prompts that cause unsafe or potentially unsafe responses identified by the post-filter module, may be automatically submitted to a malicious prompt corpus that may be used to further train the LLM and/or expedite the pre-filtering and post-filtering in the future.

The system according to various embodiments may execute the pre-filter and post-filter modules at separate times, or simultaneously.

The use of filters to evaluate both prompts input into an LLM and the content output by the LLM in real time may provide improvements over currently available solutions, as it expands the breadth of security with respect to applications built thereon. Thus, changes to detection thresholds to identify data quality anomalies, and natural language processing to identify the impact of data quality problems, may provide improvements over currently available solutions.

Various embodiments may be implemented within enterprise software used to manage a variety of communication systems 100, an example of which is illustrated in FIG. 1.

With reference to FIG. 1, the communication system 100 may include various client devices such as a set top box (STB) 102, a mobile device 104, a computer 106. In addition, the communication system 100 may include network elements such as network computing devices 110, 112, and 114, and a communication network 150. In various embodiments, the network computing devices 110, 112, 114 may be part of an enterprise system. The STB 102, the mobile device 104, the computer 106, and the network computing devices 110, 112, and 114 may communicate with the communication network 150 via a respective wired or wireless communication link 120, 122, 124, 126, 128 and 132. The network computing device 112 may communicate with a data store **112*a* via a wired or wireless communication link 130**.

The STB 102 may include customer premises equipment, which may be implemented as a set top box, a router, a modem, or another suitable device configured to provide functions of an STB. The mobile device 104 may include any of a variety of portable computing platforms and communication platforms, such as cell phones, smart phones, Internet access devices, and the like. The computer 106 may include any of a variety of personal computers, desktop computers, laptop computers, and the like. Other example client devices may include, for example, one or more of a tablet, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device.

The network computing device 110 may be configured to perform operations related to management of computing resources. Such computing resources may be provided, for example, by the network computing devices 112 and 114. In some embodiments, execution of a task or service may require data or information stored in the data store **112*a***.

The STB 102, the mobile device 104, and the computer 106 may each include a processor or processing device that may execute one or more client applications (e.g., client application **104*a*). The client application 104*a* may send (via the mobile device 104) a call to the network computing device 114. The call may include a request for information from, for example, a target system executing on, or available through, the network computing device 112**.

The communication network 150 may support wired and/or wireless communication among the STB 102, the mobile device 104, the computer 106, and the network computing devices 110, 112, and 114. The communication network 150 may include one or more additional network elements, such as servers and other similar devices (not illustrated). The communication system 100 may include additional network elements to facilitate communication among the STB 102, the mobile device 104, the computer 106, and the network computing devices 110, 112, and 114. The communication links 120, 122, 124, 126, 128, 130 and 132 may include wired and/or wireless communication links. Wired communication links may include coaxial cable, optical fiber, and other similar communication links, including combinations thereof (for example, in an HFC network). Wireless communication links may include a plurality of carrier signals, frequencies, or frequency bands, each of which may include a plurality of logical channels. Wired communication protocols may use a variety of wired networks (e.g., Ethernet, TV cable, telephony, fiber optic and other forms of physical network connections) that may use one or more wired communication protocols, such as Data Over Cable Service Interface Specification (DOCSIS), Ethernet, Point-To-Point protocol, High-Level Data Link Control (HDLC), Advanced Data Communication Control Protocol (ADCCP), and Transmission Control Protocol/Internet Protocol (TCP/IP), or another suitable wired communication protocol.

The wireless and/or wired communication links 120, 122, 124, 126, 128, 130 and 132 may include a plurality of carrier signals, frequencies, or frequency bands, each of which may include a plurality of logical channels. Each of the wireless communication links may utilize one or more radio access technologies (RATs). Examples of RATs that may be used in one or more of the various wireless communication links 120, 122, 124, 126, 128, 130 and 132 include an Institute of Electrical and Electronics Engineers (IEEE) 802.15.4 protocol (such as Thread, ZigBee, and Z-Wave), any of the Institute of Electrical and Electronics Engineers (IEEE) 16.11 standards, or any of the IEEE 802.11 standards, the Bluetooth standard, Bluetooth Low Energy (BLE), 6LoWPAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless.

Further examples of RATs that may be used in one or more of the various wireless communication links within the communication system 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof.

Figure 2:
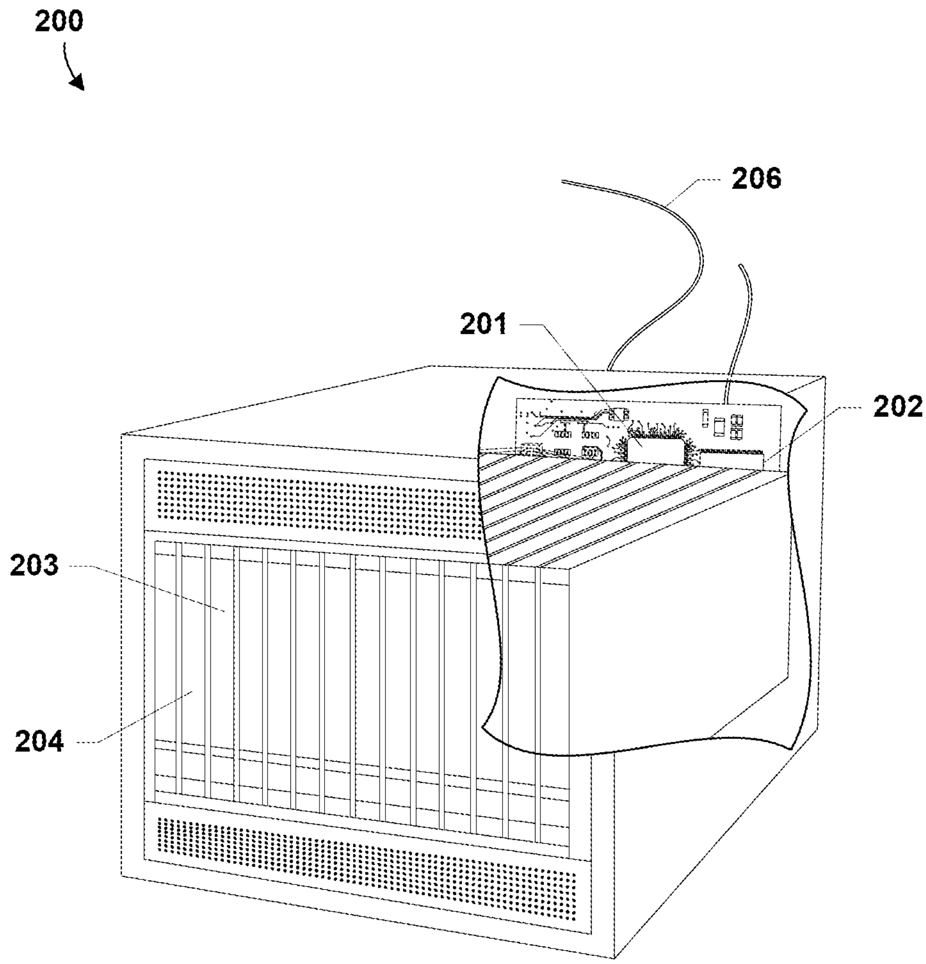
FIG. 2 is a system block diagram illustrating components of a network computing device for implementing various embodiments.

Various embodiments may use a computing device as a server, router, or another suitable element of a communication network. Such network elements may typically include at least the components illustrated in FIG. 2, which illustrates an example network computing device 200. With reference to FIGS. 1 and 2, the network computing device 200 (e.g., the computing devices 110, 112, and 114) may include a processor 201 coupled to volatile memory 202 and a large capacity nonvolatile memory, such as a disk drive 203. The network computing device 200 may also include a peripheral memory access device such as a floppy disc drive, compact disc (CD) or digital video disc (DVD) drive 204 coupled to the processor 201. The network computing device 200 may also include network access ports 206 (or interfaces) coupled to the processor 201 for establishing data connections with a network, such as the Internet and/or a local area network coupled to other system computers, servers, or components in a service provider network. Similarly, the network computing device 200 may include additional access ports, such as USB, Firewire, Thunderbolt, and the like for coupling to peripherals, external memory, or other devices.

Figure 3:
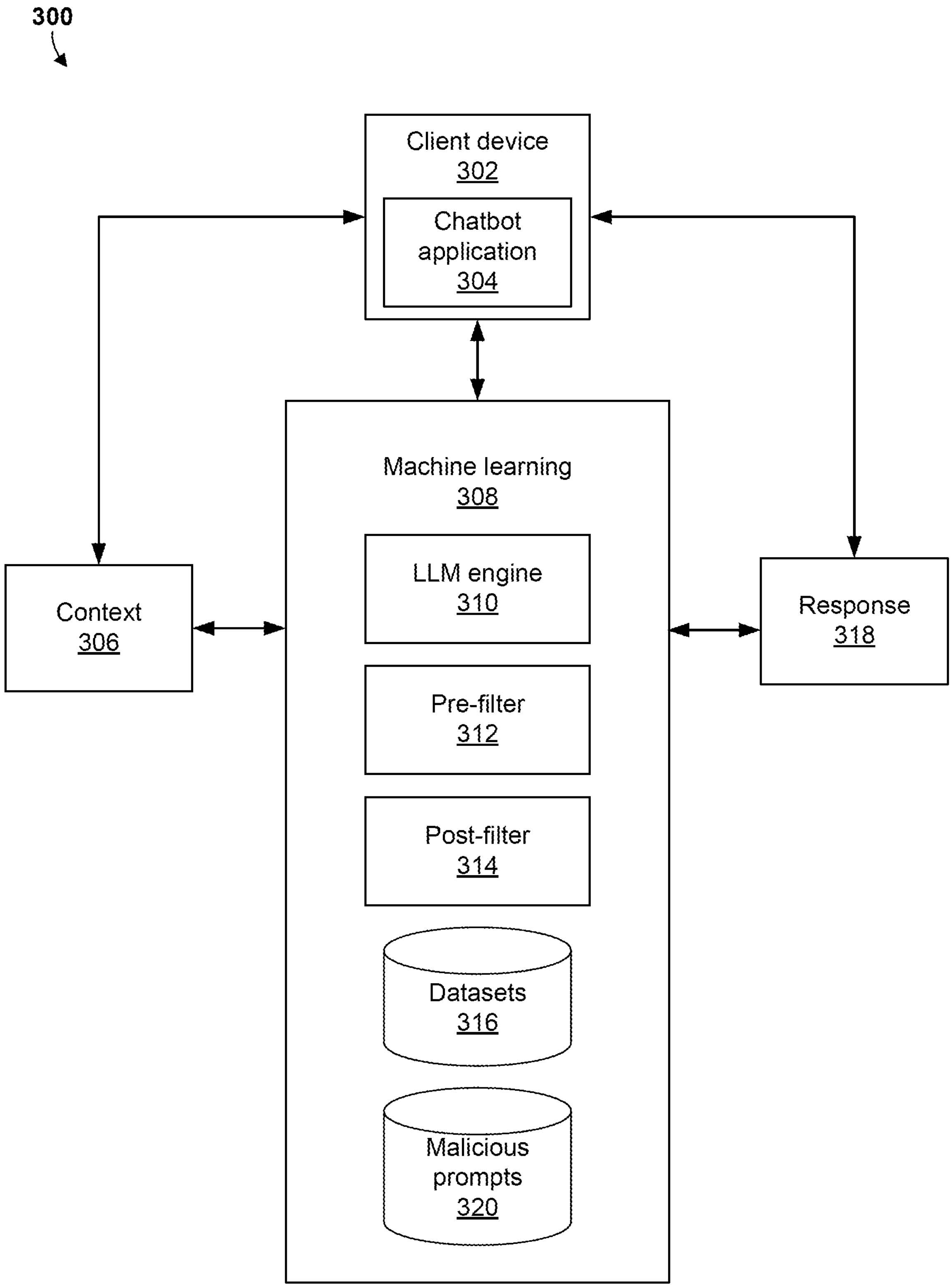
FIG. 3 is a component block diagram illustrating components of a machine learning architecture suitable for use in various embodiments.

FIG. 3 illustrates the components of an example architecture for a machine learning system 300 according to various embodiments. With reference to FIGS. 1-3, a client device 302 (e.g., devices 102, 104, and 106) may execute a chatbot application 304.

The chatbot application 304 may be automated messaging application that interacts with a bot system (also referred to as a bot, chatterbot, Talkbot, or virtual assistant). In various embodiments, a bot system may be any of a number of computer programs that can perform conversations with end users. Through the chatbot application, a bot system may generally respond to natural-language messages (e.g., questions or comments). A bot system may be implemented using software only (e.g., program, code, or other instructions executed by one or more processor), using hardware, or using a combination of hardware and software. The bot system may be implemented in various physical devices (e.g., computing device, server, mobile device, etc.). Enterprises may use one or more bot system to communicate with end users/customers.

In some embodiments, the automated chat application 304 may be separate from an operating system of the client device 302, or alternatively may be implemented directly by the operating system of the client device 302. In some embodiments, the automated chat application 304 may be implemented remotely and communicatively coupled to the client device 302 via one or network (e.g., one or more WLAN, including Wi-Fi LANs, mesh networks, Bluetooth, near-field communication, etc.) or one or more WAN, including the Internet). In some embodiments, the chatbot application 304 may be an end user preferred messaging application that the end user has already installed and familiar with. The chatbot application 304 may be configured to include or interface with, for example, over-the-top (OTT) messaging channels (e.g., Facebook Messenger®, Facebook WhatsApp®, WeChat®, Line®, Kik®, Telegram®, Talk®, Skype®, Slack®, or SMS), virtual private assistants (e.g., Amazon Dot®, Echo®, or Show®, Google Home®, Apple HomePod®, etc.), mobile and web app extensions that extend native or hybrid/responsive mobile or web applications with chat capabilities, or voice based input (e.g., Siri®, Cortana®, Google Voice®, etc.).

In executing the chatbot application 304, the client device 302 may enable a user to engage in a human-to-computer dialog. Specifically, through the chatbot application 304, a user may send a message to or request an action from a bot system, and may receive a generated natural language response.

In various embodiments, the client device 302 may be configured to detect input provided by a user of the client device 302 using one or more user interface input devices. For example, the client device 302 may be equipped with one or more keyboard, hardware button(s), touchscreen, microphone, etc. The client device 302 may also be equipped with one or more user interface output devices, such as display, speaker, etc. In various embodiments, the user input may be in text form (e.g., typing input to the chatbot application 304) or in audio input or speech form. Such input may be in a language spoken by the user, and various speech-to-text processing techniques may be used to convert a speech or audio input to a text utterance for processing by the chatbot application 304.

A text utterance may be a text fragment, a sentence, multiple sentences, and the like. In various embodiments, natural language understanding (NLU) techniques may be applied to the text utterance, either by the chatbot application 304 or the bot system with which it communicates, to understand the meaning of the user input. Such NLU techniques may include identifying one or more intents and one or more entities corresponding to the utterance.

In various embodiments, a bot system may implement a machine learning framework 308 to perform one or more responsive action or operation. In particular, the machine language framework 308 may accomplish various NLP related tasks using, such as such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, etc.). In some embodiments, a portion of NLP tasks may be performed by the chatbot application 304, which may in turn use other resources to perform portions of the NLU processing. For example, the syntax and structure of a sentence may be identified by processing the sentence using a parser, a part-of-speech tagger, and/or a named entity recognizer.

In some embodiments, the client device 302 may be configured to communicate with context data 306 used by the machine learning framework 308. For example, a user's location may be determined using signals and/or sensors on the client device 304 (e.g., such as Wi-Fi, Bluetooth, cellular, GPS, etc.). In some embodiments, other wireless signal characteristics, such as time-of-flight, signal strength, etc., may be used, alone or collectively, to determine the location of the client device.

In various embodiments, the user's identity may be confirmed by the client device 302, and used to inform the context data 306. Such confirmation may be done, for example, using a text input passcode, or alternatively, using biometric data (e.g., facial or speech recognition, or fingerprint identification), photo of their face, a record of their voice, or an image of their fingerprint. For example, in some embodiments, a user may be identified as an administrator or other role with different access privileges to information. Such context data 306 may be used by the machine learning framework 308 to change the type of content considered to be unsafe in the pre-filtering and post-filtering processes, discussed below.

In various embodiments, the context module 306 may include any of a number of specialized programs executing in a processing system, configured to analyze specific types of data or information, and generate outputs that are in a format suitable for input to the LLM. Some such programs may be configured to receive information from text-based sources, such as memory, formatting such text commission into a format that is suitable for use in generating prompts for LLM. Other information submodules may be configured to receive non-textual data, such as sensor data (e.g., cameras, microphones, accelerometers, etc.) and interpret the data to generate text-based output suitable for input to the LLM. In various embodiments, such submodules may interact with one another and/or other components within the computing system to provide or implement high-level functions.

The machine learning framework 308 may be implemented in one or more processors of one or more computing devices of an enterprise system (e.g., the computing devices 110, 112, 114, 200). In various embodiments, the machine learning framework 308 may be implemented in software, hardware, or a combination of software and hardware.

In various embodiments, user input (e.g., received through the automated chat application 304) may be expressed in a textual form that follows natural language semantics. In some embodiments, one or more module of the machine learning framework 308 may execute NLP tasks on ingested data. Such tasks may include, for example, speech recognition for reliably converting voice data into text, grammatical tagging for determining the part of speech of a particular word or piece of text based on use and context, and word-sense disambiguation to select the appropriate meaning of a word through semantic analysis.

In various embodiments, the machine learning framework 308 may include an LLM engine 310, a pre-filter module 312, a post-filter module 314, and various datasets 316. In some embodiments, the operations performed by the machine learning framework 308 may be distributed across multiple computer systems.

The LLM engine may use one or more stored LLM to perform various NLP tasks in order to generate an appropriate output.

Such NLP tasks may also include, for example, terminology extraction to automatically pick up relevant terms, entity linking to identify a named-entity in context, and co-reference resolution to identify multiple words referring to the same entity (e.g., anaphora resolution to match pronouns with nouns).

NLP tasks may also include, for example, relationship extraction to identify the relationships among named entities, and discourse analysis to re-identify the discourse structure of connected text. NLP tasks may further include, for example, topic segmentation/recognition to separate text into segments that are devoted to different topics, sentiment analysis to extract subjective qualities (e.g., attitudes, emotions, confusion, sarcasm, etc.) from text, argument mining to automatically extract and identify argumentative structures from natural language text, and others.

Various NLP tools and approaches that are presently availability and may be implemented in the machine learning system include Python programing and Natural Language Toolkit (NLTK), which includes libraries for many of the NLP tasks and subtasks. Such subtasks may include, for example, sentence parsing, word segmentation, stemming and lemmatization, and tokenization for phrases, sentences, paragraphs and passages. The NLTK further includes libraries for implementing capabilities such as semantic reasoning, the ability to reach logical conclusions based on facts extracted from text.

Another NLP approach that may be employed is statistical NLP, which combines computer algorithms with machine learning and deep learning models to automatically extract, classify, and label elements of input data, and assign a statistical likelihood to each possible meaning of those elements. In various embodiments, deep learning models may be based on convolutional neural networks (CNNs) and recurrent neural networks (RNNs) to enable machine learning from use of NLP tools over time. In this manner, the system may extract more accurate meaning from volumes of raw, unstructured, and unlabeled text and voice data sets.

By using the LLM engine 310 to accomplish NLP tasks, and subject to the pre-filter module 312 and the post-filter module 314, the machine learning framework 308 may generate a response 318. In particular, such generation may be initially in the form of an LLM output based on processing input received from the client device 302 (i.e., one or more prompt), and context information 306. The context signals may include the context of a dialog session in which the prompt is received and/or the context of information about the particular user (e.g., user role, location, etc.), In various embodiments, the one or more stored LLM may include, for example, transformer models (e.g., Meena®), recurrent neural networks, and/or any other LLM.

In various embodiments, the LLM output may include, for example, a probability distribution over a sequence of one or more words and/or phrases across one or more vocabularies. One or more of the words and/or phrases in the sequence may be selected as the response 318 based on the probability distribution.

In various embodiments, the pre-filter module 312 and the post-filter module 314 may be configured to run simultaneously or sequentially to evaluate input prompts and the LLM output. The pre-filter module 312 and the post-filter module 314 may each use the same or different models same LLM as the LLM engine 310, and may use the same or different model(s) as the LLM engine 310.

In some embodiments, the LLM response 318 generated from the output may utilized by various components of the machine learning framework 306. For example, the LLM response 318 may be added to one or more dataset 310 (e.g., a corpus), and/or used in the future by the LLM engine 310.

In various embodiments, the datasets 316 may be from one or more data sources that deliver data to the system through data interfaces (e.g., secure socket layers (SSLs), via virtual private networks (VPNs), HTTPs, or through other connections). Such data may include, for example, various forms of customer/client interaction by an enterprise network, including event logs, system logs, application logs, database logs, threat software data, operational intelligence, machine data that includes records of the activity and behavior of network customers and users, as well as activity and behavior records of transactions, applications, servers, networks and mobile devices on the network. As additional examples, the data from the datasets 316 may include data relating to machine configurations, web access logs, operating system events, message queues, change events, diagnostic command output, transaction records such as call detail records, and sensor data.

In various embodiments, the machine learning framework 308 may include one or more separate database for unsafe content encountered. For example, prompts determined to be unsafe by the pre-filter module 312, or that cause the LLM engine 310 to generate unsafe output determined by the post-filter module 314, may be added to a malicious prompt corpus 320. In some embodiments, unsafe content (i.e., prompts or LLM output) may be stored for subsequent review in one or more additional content storage.

The systems and methods according to various embodiments may be provided through software modules installed on a single computing device, or on multiple computing devices.

Figure 4:
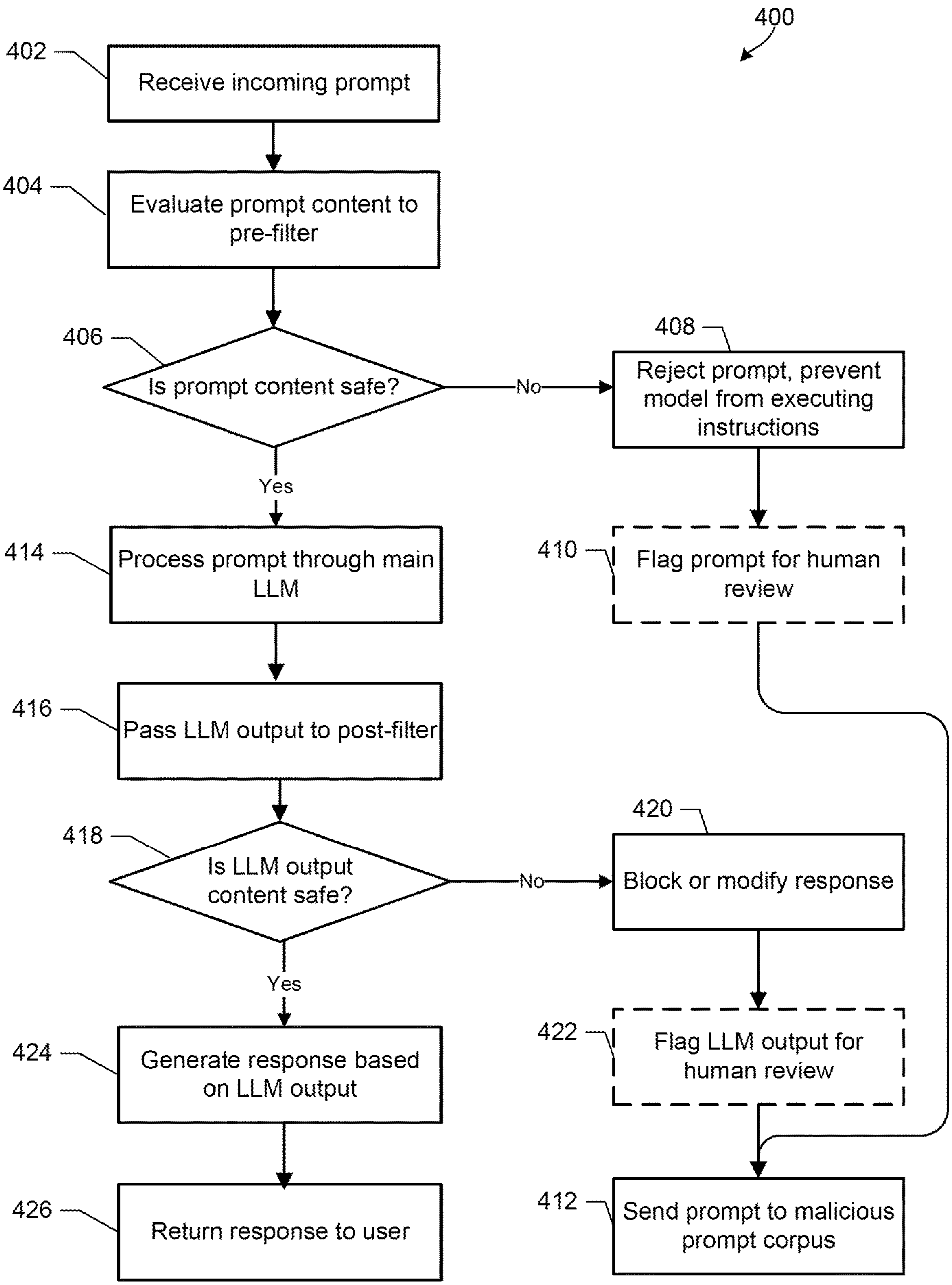
FIG. 4 is a process flow diagram illustrating a method for detecting and preventing prompt injection attacks in a machine learning system according to various embodiments.

FIG. 4 is a process flow diagram illustrating a method 400 for detecting and preventing prompt injection attacks on machine learning systems that use LLMs according to various embodiments. With reference to FIGS. 1-4, the operations of the method 400 may be implemented in hardware components and/or software components of a computing system (e.g., network computing device 110, 112, 114, 200) the operation of which may be controlled by one or more processors (e.g., the processor 201 and/or the like), referred to herein as a "processor." In various embodiments, the processor may be part of software used to provide an automated chatbot application 304 to a client device 302.

In block 402, the processor may receive an incoming prompt from a user. Such prompts may be identified, for example, from user input data to the client device 302 communicated via the automated chatbot application 304. Sources of prompts may include, for example, text data, voice data, and/or other forms of information received. In various embodiments, user input may also be used to enter criteria for monitoring the pre-determined control points, such as thresholds of deviation from an expected target.

In block 404, the processor may pass the prompt content to one or more pre-filter. In various embodiments, the one or more pre-filter may be a pre-filter module running on the machine learning system. In some embodiments, the pre-filter may employ one or more LLM and/or other data analysis schemes to review the incoming prompt. In some embodiments, the pre-filter may be configured to also use context information relating to the user's identity, location, or role within an organization.

In determination block 406, the processor may determine whether the prompt content is safe based on the pre-filter evaluation. In response to determining that the prompt content is not safe (i.e., determination block 406="No"), the processor may reject the prompt in block 408, thereby preventing the main LLM from executing instructions. In some embodiments, the processor may be configured to return a pre-set output message indicating that the machine learning system will not process the user's request (e.g., an "error" message, a "request denied" message, etc.).

In optional block 410, the processor may flag the unsafe prompt for human review. In block 412, the processor may send the unsafe prompt to a malicious prompt corpus. In some embodiments, the malicious prompt corpus may be stored in a database that is part of the machine learning system, or may be sent to a separate system that operates remotely.

In response to determining that the prompt content is safe (i.e., determination block 406="Yes"), the processor may process the prompt through the main LLM in block 414. Such processing may be based on the specific prompt and the instructions contained therein (i.e., to provide the answer to a question, to output text content based on a topic, to translate text from one language to another, etc.). In various embodiments, the main LLM may be composed of one or more LLMs and/or include other machine learning and/or generative artificial intelligence (AI) algorithms. In various embodiments, an LLM output may be generated by the main LLM processing.

In block 416, the LLM output may be passed to one or more post-filter. In various embodiments, the one or more post-filter may be a post-filter module running on the machine learning system. In some embodiments, the post-filter may employ one or more LLM and/or other data analysis schemes to review the content that is output by the main LLM. In some embodiments, the post-filter may be configured to also use context information relating to the user's identity, location, or role within an organization to further specify the type or security of information to which the user should have access.

In determination block 418, the processor may determine whether the content of the LLM output is safe based on the post-filter evaluation. In some embodiments, determining whether the content of the LLM output is safe may include whether it contains undesired output, for example, based on the topic or context of the input.

In response to determining that the content of the LLM output is not safe (i.e., determination block 418="No"), the processor may prevent the machine learning system from returning a response to the user, or may generate a modified response to the user in block 420. In some embodiments, the processor may be configured to return a pre-set output message indicating that the machine learning system is unable to provide a response (e.g., an "error" message, a "request denied" message, etc.). In some embodiments, the output message may include information as to the reason for lack of response or complete response (i.e., an "information not available" message, an "access is not authorized" message, an added line of "certain data has been redacted," etc.).

In optional block 422, the processor may flag the unsafe LLM output for human review. In block 412, the processor may send the original incoming prompt that resulted in creating the unsafe LLM output to the malicious prompt corpus.

In response to determining that the content of the LLM output is safe (i.e., determination block 418="Yes"), the processor may generate a response based on the LLM output in block 424. In block 426, the processor may return the response to the user. For example, the processor may cause text or other data to be sent to the client device 302 from which the original prompt was received. In some embodiments, the user may receive the response via the automated chatbot application 304. In some embodiments, the incoming prompt and/or the response may also be stored in a database.

Figure 5:
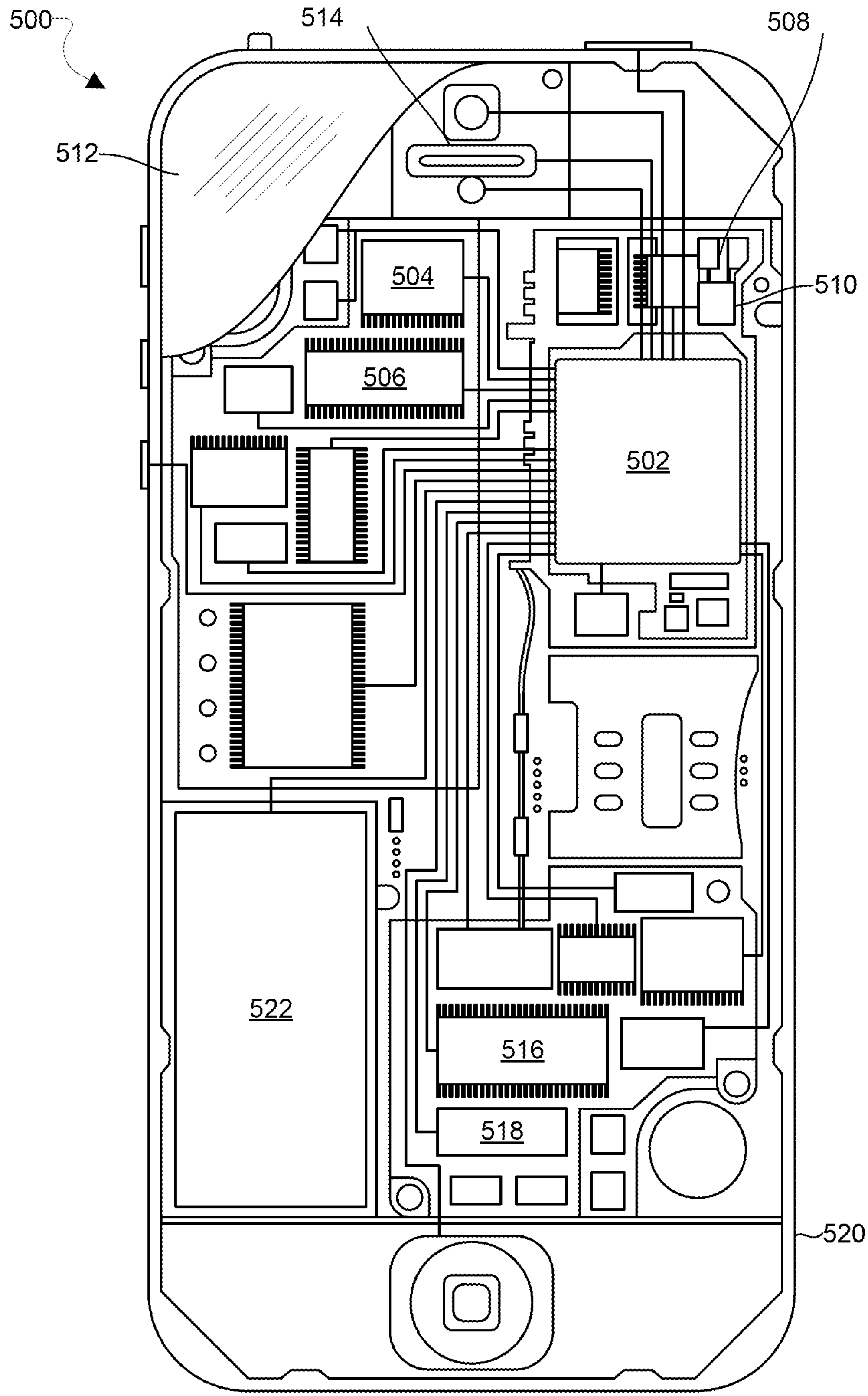
FIG. 5 is a component diagram of an example wireless communication device suitable for use with the various embodiments.

The various embodiments may be implemented in any of a variety of client device(s) 302, an example of which is illustrated in FIG. 5. For example, with reference to FIGS. 1-5, a wireless device 500 (which may correspond, for example, the devices 102, 103, 106) may include a processor 502 coupled to a touchscreen controller 504 and an internal memory 506. The processor 502 may be one or more multicore integrated circuits (ICs) designated for general or specific processing tasks. The internal memory 506 may be volatile or non-volatile memory, and may also be secure and/or encrypted memory, or unsecure and/or unencrypted memory, or any combination thereof. The wireless device 500 may include a battery/power source 522.

The touchscreen controller 504 and the processor 502 may also be coupled to a touchscreen panel 512, such as a resistive-sensing touchscreen, capacitive-sensing touchscreen, infrared sensing touchscreen, etc. and speaker/microphone 514. The wireless device 500 may have one or more radio signal transceivers 508 (e.g., Peanut®, Bluetooth®, Zigbee®, Wi-Fi, RF radio) and antennae 510, for sending and receiving, coupled to each other and/or to the processor 502. The transceivers 508 and antennae 510 may be used with the above-mentioned circuitry to implement the various wireless transmission protocol stacks and interfaces. The wireless device 500 may include a cellular network wireless modem chip 516 that enables communication via a cellular network and is coupled to the processor.

The wireless device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown). The wireless device 500 may also include speakers 514 for providing audio outputs.

The wireless device 500 may also include a housing 520, constructed of a plastic, metal, or a combination of materials, for containing all or some of the components discussed herein. The wireless device 500 may include a power source 522 coupled to the processor 502, such as a disposable or rechargeable battery. The rechargeable battery may also be coupled to the peripheral device connection port to receive a charging current from a source external to the wireless device 500.

The processors 201, 502, and modem or modem chip 516 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in an internal memory before they are accessed and loaded into processors 201, 502, and modem or modem chip 516.

The processors 201, 502, and modem or modem chip 516 may include internal memory sufficient to store the application software instructions. In many devices the internal memory may be a volatile or nonvolatile memory, such as flash memory, or a mixture of both. For the purposes of this description, a general reference to memory refers to memory accessible by the processors 201, 502, and modem or modem chip 516, including internal memory or removable memory plugged into the wireless communication device and memory within the processors 201, 502, and modem or modem chip 516 themselves.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method for preventing prompt injections in a communication system, the method comprising:

receiving, by one or more network computing device, a prompt from a client computing device, wherein the prompt is configured to invoke a machine-learning application;

evaluating, by the one or more network computing device, content of the prompt using one or more pre-filter module;

determining, by the one or more network computing device, whether the content of the prompt is safe based on the pre-filter module evaluation and on received context information about a user of the client computing device, wherein the context information includes at least one of the user's identity, location, or role within an organization, and in response to determining that the content of the prompt is safe:

inputting the prompt, by the one or more network computing device, to a main machine-learning model for processing, wherein processing the prompt by the main machine-learning model creates a machine-learning output;

evaluating, by the one or more network computing device, content of the machine-learning output using one or more post-filter module; and determining, by one or more network computing device, whether the content of the machine-learning output is safe based on the post-filter module evaluation.

2. The method of claim 1, further comprising, in response to determining that the content of the machine-learning output is safe:

generating, by the one or more network computing device, a response message based on the machine-learning output; and returning the response message to the client computing device.

3. The method of claim 1, further comprising:

preventing, by the one or more network computing device, execution of the prompt by the machine-learning model in response to determining that the content of the prompt is not safe.

4. The method of claim 3, further comprising:

sending, by the one or more network computing device, the prompt to a malicious prompt corpus in response to determining that the content of the prompt is not safe.

5. The method of claim 4, wherein the malicious prompt corpus comprises a database accessible to the one or more network computing device, and wherein the at least one pre-filtering module and the at least one post-filtering module are configured to use the malicious prompt corpus to improve evaluations.

6. The method of claim 3, further comprising flagging, by the one or more network computing device, the prompt for future review in response to determining that the content of the prompt is not safe.

7. The method of claim 1, further comprising:

preventing, by the one or more network computing device, generation of a response message in response to determining that the content of the machine-learning output is not safe.

8. The method of claim 1, further comprising, in response to determining that the content of the machine-learning output is not safe:

generating, by the one or more network computing device, an error message; and returning the error message to the client computing device.

9. The method of claim 1, further comprising:

flagging, by the one or more network computing device, the prompt for future review in response to determining that the content of the machine-learning output is not safe.

10. The method of claim 1, further comprising:

sending, by the one or more network computing device, the prompt to a malicious prompt corpus in response to determining that the content of the machine-learning output is not safe.

11. The method of claim 1, wherein the context information is used to adjust a type of content considered to be unsafe in the pre-filter module evaluation.

12. A network computing device comprising:

a processor configured with processor-executable instructions to perform operations comprising:

receiving a prompt from a client computing device, wherein the prompt is configured to invoke a machine-learning application;

evaluating content of the prompt using one or more pre-filter module;

determining whether the content of the prompt is safe based on the pre-filter module evaluation and on received context information about a user of the client computing device, wherein the context information includes at least one of the user's identity, location, or role within an organization; and in response to determining that the content of the prompt is safe:

inputting the prompt to a main machine-learning model for processing, wherein processing the prompt by the main machine-learning model creates a machine-learning output;

evaluating content of the machine-learning output using one or more post-filter module; and determining whether the content of the machine-learning output is safe based on the post-filter module evaluation.

13. The network computing device of claim 12, wherein the processor is configured with processor-executable instructions to perform operations further comprising, in response to determining that the content of the machine-learning output is safe:

generating a response message based on the machine-learning output; and returning the response message to the client computing device.

14. The network computing device of claim 12, wherein the processor is configured with processor-executable instructions to perform operations further comprising:

preventing execution of the prompt by the machine-learning model in response to determining that the content of the prompt is not safe.

15. The network computing device of claim 14, wherein the processor is configured with processor-executable instructions to perform operations further comprising:

sending the prompt to a malicious prompt corpus in response to determining that the content of the prompt is not safe.

16. The network computing device of claim 15, wherein:

the malicious prompt corpus comprises a database accessible to the one or more network computing device, and the processor is configured with processor-executable instructions to perform operations such that the malicious prompt corpus is used by the at least one pre-filtering module and the at least one post-filtering module to improve evaluations.

17. The network computing device of claim 14, wherein the processor is configured with processor-executable instructions to perform operations further comprising:

flagging the prompt for future review in response to determining that the content of the prompt is not safe.

18. The network computing device of claim 12, wherein the processor is configured with processor-executable instructions to perform operations further comprising:

preventing generation of a response message in response to determining that the content of the machine-learning output is not safe.

19. The network computing device of claim 12, wherein the processor is configured with processor-executable instructions to perform operations further comprising, in response to determining that the content of the machine-learning output is not safe:

generating an error message; and returning the error message to the client computing device.

20. The network computing device of claim 12, wherein the processor is configured with processor-executable instructions to perform operations further comprising:

flagging the prompt for future review in response to determining that the content of the machine-learning output is not safe.

21. The network computing device of claim 12, wherein the processor is configured with processor-executable instructions to perform operations further comprising:

sending the prompt to a malicious prompt corpus in response to determining that the content of the machine-learning output is not safe.

22. The network computing device of claim 12, wherein the context information is used to adjust a type of content considered to be unsafe in the pre-filter module evaluation.

23. A non-transitory processor readable medium having processor executable instructions stored thereon configured to cause a processor to perform operations comprising:

receiving a prompt from a client computing device, wherein the prompt is configured to invoke a machine-learning application;

evaluating content of the prompt using one or more pre-filter module;

determining whether the content of the prompt is safe based on the pre-filter module evaluation and on received context information about a user of the client computing device, wherein the context information includes one or more of the user's identity, location, or role within an organization; and in response to determining that the content of the prompt is safe:

inputting the prompt to a main machine-learning model for processing, wherein processing the prompt by the main machine-learning model creates a machine-learning output;

evaluating content of the machine-learning output using one or more post-filter module; and determining whether the content of the machine-learning output is safe based on the post-filter module evaluation.

24. The non-transitory processor readable medium of claim 23, wherein the processor executable instructions are configured to cause a processor to perform operations further comprising, in response to determining that the content of the machine-learning output is safe:

generating a response message based on the machine-learning output; and returning the response message to the client computing device.

25. The non-transitory processor readable medium of claim 23, wherein the processor executable instructions are configured to cause a processor to perform operations further comprising:

preventing execution of the prompt by the machine-learning model in response to determining that the content of the prompt is not safe.

26. The non-transitory processor readable medium of claim 25, wherein the processor executable instructions are configured to cause a processor to perform operations further comprising:

sending the prompt to a malicious prompt corpus in response to determining that the content of the prompt is not safe.

27. The non-transitory processor readable medium of claim 26, wherein:

the malicious prompt corpus comprises a database accessible to the one or more network computing device, and the processor executable instructions are configured to cause a processor to perform operations such that the malicious prompt corpus is used by the at least one pre-filtering module and the at least one post-filtering module to improve evaluations.

28. The non-transitory processor readable medium of claim 25, wherein the processor executable instructions are configured to cause a processor to perform operations further comprising:

flagging the prompt for future review in response to determining that the content of the prompt is not safe.

29. The non-transitory processor readable medium of claim 23, wherein the processor executable instructions are configured to cause a processor to perform operations further comprising:

preventing generation of a response message in response to determining that the content of the machine-learning output is not safe.

30. The non-transitory processor readable medium of claim 23, wherein the processor executable instructions are configured to cause a processor to perform operations further comprising, in response to determining that the content of the machine-learning output is not safe:

generating an error message; and returning the error message to the client computing device.

* * * * *